2,693,459

HIGH IMPACT STRENGTH PLASTIC COMPOSITION CONTAINING POLYVINYL ACETAL RESIN AND CHLOROSULFONATED POLYETHYLENE ELASTOMER

Charles F. Fisk, Clifton, N. J., assignor to United States Rubber Company, New York, N. Y., a corporation of New Jersey No Drawing. Application August 28, 1952, Serial No. 306,947

5 Claims. (Cl. 260—45.5)

This invention concerns improved tough mixtures of certain resinous and rubbery materials, of the kind sometimes termed "gum plastics," and more particularly it concerns certain novel blends of polyvinyl acetal resins with rubbery chlorosulfonated polyethylene, characterized particularly by unusually high impact strength, in combination with great hardness and rigidity.

The invention is based on the unexpected discovery that admixture of rubbery chlorosulfonated polyethylene with polyvinyl acetal resins in certain proportions produces a hard, tough mixture having an impact strength far in excess of that of mixtures of these same materials in other proportions. More specifically, it has been found that addition of relatively minor amounts of rubbery chlorosulfonated polyethylene, within the range of from about 4 to about 15 parts by weight, to polyvinyl acetal resins, correspondingly in amount within the range of from about 96 to 85 parts by weight, produces a remarkable improvement in impact strength.

The polyvinyl acetal resins employed in the invention are well known materials, typically derived by conventional methods from polyvinyl acetate by hylrolysis of the latter material, followed by reaction with an aldehyde. As is explained by Schildknecht in "Vinyl and Related Polymers" (published by John Wiley and Sons, Inc., New York, N. Y., in 1952) at page 358, high-polymer chemists use the term "polyvinyl acetals" to indicate polyvinyl alcohols which have had a major part of their hydroxyl groups condensed with aldehydes. One molecule of the aldehyde condenses with two hydroxyls to yield the acetal, and the resulting material is insoluble in water, in contrast to polyvinyl alcohol, which is water soluble (cf. page 490, "Handbook of Plastics" by Simonds et al., D. Van Nostrand, 2nd edition, 1949). The final polyvinyl acetal resin is generally characterized by the viscosity of the polyvinyl acetate used as the starting material and the degree of acetate replacement by aldehyde. It has been found that the high impact strength phenomenon of the present invention is obtained to best advantage with those polyvinyl acetal resins in which the acetate replacement by aldehyde is relatively high, preferably well over about 75% (in terms of the nominal degree of replacement in accordance with the practice in the trade). The polyvinyl acetal resins are usually made from the lower alkyl aldehydes, such as formaldehyde, acetaldehyde and butyraldehyde. Polyvinyl formal and polyvinyl butyral constitute the commonest commercially available polyvinyl acetal resins and are preferred in the invention. Of these materials, polyvinyl formal represents the most preferred polyvinyl acetal resin for use in the invention. The polyvinyl acetals are thermoplastic resins; they are much used in coating and laminating, and they can also be molded into shaped articles. While they have many desirable physical characteristics, their impact strength is not as great as is required for certain uses. The impact strength of the polyvinyl acetals can be improved only slightly by addition of plasticizers, and this expedient results in a concomitant loss of rigidity and hardness. The present invention affords a means for increasing the impact strength of the polyvinyl acetals, without undue sacrifice of rigidity or hardness, by addition of small amounts of chlorosulfonated polyethylene rubber.

The rubbery chlorosulfonated polyethylene component of the present mixture is a known commercially available material and is disclosed in U. S. Patent 2,586,363 of McAlevy. It is made by chlorosulfonation of normally solid ethylene polymers or interpolymers, and the typical commercial material contains approximately 28% chlorine and 1.5% sulfur. The latter two elements are chemically combined with a hydrocarbon chain, with most of the chlorine substituted on the chain, and the sulfur is combined with chlorine and attached to the chain as sulfonyl chloride ($SO_2Cl$) groups. There is usually approximately one chlorine atom for every 6 or 7 carbon atoms, and one sulfonyl chloride for every 90 to 130 carbon atoms. This material is vulcanizable, usually with the aid of metal oxides, accelerators and organic acids, but, for purposes of the present invention, vulcanization of the mixture is generally unnecessary, and is ordinarily not preferred, because the thermoplastic blend is directly re-usable if it has not been vulcanized.

The resin-chlorosulfonated polyethylene blends of the invention may be prepared by intimately mixing the polyvinyl acetal resin and the rubbery material in the required proportions in any suitable manner. The mixing equipment commonly used for working rubber or plastics, such as roll mills or internal mixers, is suitable for this purpose, and the mixing operation is facilitated by elevated temperatures. The milling temperatures commonly employed when compounding polyvinyl acetals, e. g., stock temperatures of about 300° to 350° F., may be employed to advantage. In general, it has been found that the present blends of resin and rubbery material in the stated proportions possess unusually good processability and they can be readily mixed to a smooth consistency without exceeding a mixing temperature of about 300° to 350° F., whereas previously known "gum plastic" blends of resins and rubbers have required substantially higher processing temperatures, usually temperatures above 350° and as high as 400° F., for adequate mixing. This facility of mixing and processing is an important advantage of the present polyvinyl acetal resin-rubber blends. Similarly, the present blends can be molded easily at temperatures of about 300° to 330° F.

When a rubber mill is used, the chlorosulfonated polyethylene can be first banded by cold working on the mill and then the unmelted polyvinyl acetal resin powder is added in the required proportions on the cool mill, thus forming a very dead and "baggy" sheet, after which the mill rolls are heated to about 300° F. Alternatively, the mill rolls may be already at a temperature of 300° F. or above when both the rubber and the resin are added. In either case, the polyvinyl acetal resin melts and apparently dissolves in the chlorosulfonated polyethylene, and the mixture thereafter generally hugs the mill tightly like an ordinary rubber compound. The blend can then be sheeted off the mill in a smooth, limp sheet, which becomes hard and horny on cooling. The material may be chopped up or ground to produce lumps or powder suitable for molding, extruding, or calendering at elevated temperatures. Test specimens can be prepared from this material by molding in a suitable mold at 330° F., and then cooling the mold. The material may be mixed with other compounding ingredients such as fillers, reinforcing agents, dyes, pigments, stabilizers, and the like. The materials are truly thermoplastic, and may be re-milled and remolded without loss of properties. The molded products also remain soluble in organic solvents.

The most preferred mixtures of polyvinyl acetal resin with chlorosulfonated polyethylene coming within the scope of the invention are characterized by remarkably high impact strength of about 4 or more foot-pounds per inch of notch, as measured by the Izod notched sample method. Those skilled in the art will freely recognize 4 foot-pounds as a remarkable value for the impact strength of a hard plastic material, particularly in view of the fact that the polyvinyl acetal resin itself generally has an impact strength of less than 1 foot-pound. It will be understood that it is only remarkable for a plastic material to have such a high impact strength when the high impact strength is accompanied by a high modulus and high hardness. The present blends are hard and have a flexural modulus almost invariably considerably in excess of 100,000 pounds per square inch, so that they are definitely rigid materials.

There is nothing unusual in high impact strength if the flexural modulus is much below 100,000 p. s. i., and particularly when below 50,000 p. s. i. When the modulus is so low the materials are definitely non-rigid and flexible, and the Izod impact test simply yields readings that numerically are high, but meaningless with respect to indicating the true toughness of the material. The flexural modulus of the material is conveniently measured by twisting a 0.1″ x 0.5″ x 4″ molded sample at room temperature, using the torsion apparatus of Clash and Berg, as described in Industrial and Engineering Chemistry, 34 1218 (1942).

Another advantage of the polyvinyl acetal-chlorosulfonated polyethylene blends of the invention is that they are frequently quite transparent. This is perhaps the most surprising property of the present blends, and represents a most unusual advantage, since transparent gum plastic mixtures that are hard and tough have never before been known, as far as the inventor is aware.

The following example will serve to illustrate the invention in more detail. In the example, all parts are expressed by weight.

Example

A commercial polyvinyl formal resin sold under the trade designation "Formvar 7/90" was added to a commercial chlorosulfonated polyethylene known as "Hypalon S-2" in the amounts shown in the table below on a mill and worked at 300° F. to form a smooth blend, and test specimens were molded from this material at 330° F. The molded samples had the physical properties noted in the table. The blends A, B and C were transparent, but blend D was not.

| Parts | Formvar 7/90 | Hypalon S-2 | Impact Strength, ft. lbs./in. notch | Rockwell Hardness | Shore D Hardness | Flexural Modulus, Thousands of p. s. i. | |
|---|---|---|---|---|---|---|---|
| | | | | | | 25° C. | 75° C. |
| A | 95 | 5 | 5.4 | 121 R | 85 | 440 | |
| B | 90 | 10 | 16.5 | 117 R | 83 | 412 | 154 |
| C | 85 | 15 | 2.6 | 112 R | 83 | 350 | |
| D | 80 | 20 | 1.0 | 97 R | 78 | 295 | 87 |

The acetal resin used in this example had a nominal acetate replacement value of 90%. The figures 7/90 in the designation "Formvar 7/90" indicate that the acetal resin was derived from a polyvinyl acetate having a viscosity of 7 centipoises (for a benzene solution containing 86 grams per liter), and that the reaction of the hydrolyzed polyvinyl acetate with formaldehyde was carried to the extent of 90% replacement by the aldehyde. However, the percentage replacement figure, as designated by the manufacturer, is evidently merely a nominal figure adopted for convenience; as the manufacturer's published analysis of the polyvinyl formal reveals a polyvinyl alcohol content of 7% and a polyvinyl acetate content of 11% and the remainder polyvinyl formal, in the polymer chain.

The blend B of the foregoing example, representing the preferred practice of the invention, is many times tougher than the polyvinyl formal resin itself. The desired definite improvement in impact strength is obtained only when the chlorosulfonated polyethylene rubber constitutes from about 4 to 15% of the mixture of resin and rubber. It should be emphasized that the blends within this range are definitely rigid materials, that is, the flexural modulus is of the order of at least about 100,000 p. s. i. This is adequate to permit use of the material in fabricating rigid articles, which are commonly considered to require a flexural modulus of at least about 100,000 p. s. i. for adequate rigidity.

The high impact blends of the invention are definitely hard materials. In fact, the blends are believed to be harder than any other known tough gum plastics. A molding, ⅛ inch thick of the stock B of the example is so tough that it can be struck hard with a hammer without fracture and yet it is so hard that it cannot be scratched or marked with the fingernails.

In all cases it has been determined that the desired increase in impact strength is obtainable according to the invention only when the polyvinyl acetal resin is characterized by a high degree of ester replacement (i. e., replacement of acetate groups by aldehyde groups). Thus, polyvinyl acetate itself, or polyvinyl alcohol itself, or copolymers of polyvinyl acetate and polyvinyl alcohol, do not produce the desired effect. The most favorable results are obtained with those polyvinyl acetals having the highest degree of conversion of acetate to aldehyde, and in any case it is essential to employ a polyvinyl acetal characterized by at least about 75% nominal replacement of the original acetate groups by the respective aldehyde groups. More preferably, the polyvinyl acetal resin used in the invention should have a nominal replacement of 80% or more. In certain cases, especially in the case of polyvinyl acetal itself, it is even more preferred that the nominal replacement be at least 90%, ranging up to as substantially complete replacement as is ordinarily obtainable.

The blends of the invention may be substituted to great advantage for the usual rubber or plastic compositions, or even for metals or other materials, in many applications where toughness is a requirement. Thus, the present mixtures may be used to fabricate parts for machines, such as gears and cams; parts for textile machinery such as bobbins, shuttles, pickers, etc.; containers and pipes, especially for chemical and the like operations where resistance to corrosive substances is desired, as in filter press plates and tumbling barrels for plating operations; electrical parts, such as terminal blocks, telephones, and protective casings for cable joints; as well as tote boxes and trays, luggage, radio cabinets, furniture, phonograph records, paneling or covering for interior and exterior walls and surfaces of buildings, railroad cars or ships; protective armor including body armor; automobile parts such as steering wheels, door panels, and seat parts; roller skate wheels, protective helmets, protective goggles or transparent visors and face shields, windows or port coverings, printing plates, tools, die cutting blocks, washing machine parts such as bearings and impellers, and numerous other articles, as will be evident to those skilled in the art. The blends may be laminated or otherwise reinforced with fibers or fabrics if desired in making the foregoing or other articles, although frequently the strength of the blends will be adequate without reinforcement.

Having thus described my invention, what I claim and desire to protect by Letters Patent is:

1. An improved gum plastic mixture comprising from 4 to 15% of chlorosulfonated polyethylene rubber and correspondingly from 96 to 85% of a polyvinyl acetal resin characterized by at least 75% replacement by aldehyde groups of the acetate ester groups in the polyvinyl acetate from which said resin is derived.

2. An improved gum plastic mixture comprising from 4 to 15% of chlorosulfonated polyethylene rubber and correspondingly from 96 to 85% of polyvinyl formal resin characterized by at least 75% replacement by aldehyde groups of the acetate ester groups in the polyvinyl acetate from which said resin is derived.

3. An improved gum plastic mixture comprising from 4 to 15% of chlorosulfonated polyethylene rubber and correspondingly from 96 to 85% of polyvinyl butyral resin characterized by at least 75% replacement by aldehyde groups of the acetate ester groups in the polyvinyl acetate from which said resin is derived.

4. An improved gum plastic mixture comprising from 4 to 15% of chlorosulfonated polyethylene rubber and correspondingly from 96 to 85% of polyvinyl formal resin, characterized by at least 80% replacement by aldehyde groups of the acetate ester groups in the polyvinyl acetate from which said resin is derived.

5. An improved gum plastic mixture comprising from 4 to 15% of chlorosulfonated polyethylene rubber and correspondingly from 96 to 85% of polyvinyl formal resin, characterized by at least 90% replacement by aldehyde groups of the acetate ester groups in the polyvinyl acetate from which said resin is derived.

References Cited in the file of this patent

UNITED STATES PATENTS

| Number | Name | Date |
|---|---|---|
| 2,416,061 | McAlevy et al. | Feb. 18, 1947 |